(12) United States Patent
Matsuo et al.

(10) Patent No.: US 7,740,326 B2
(45) Date of Patent: Jun. 22, 2010

(54) CORE-LESS CRAWLER TRACK AND RUBBER PROJECTIONS THEREFORE

(75) Inventors: Shuichi Matsuo, Yokohama (JP); Shinji Uchida, Yokohama (JP); Shingo Sugihara, Yokohama (JP)

(73) Assignee: Bridgestone Corporation, Tokyo (JP)

( * ) Notice: Subject to any disclaimer, the term of this patent is extended or adjusted under 35 U.S.C. 154(b) by 90 days.

(21) Appl. No.: 11/914,892

(22) PCT Filed: May 19, 2006

(86) PCT No.: PCT/JP2006/310038
§ 371 (c)(1),
(2), (4) Date: Dec. 26, 2007

(87) PCT Pub. No.: WO2006/123779
PCT Pub. Date: Nov. 23, 2006

(65) Prior Publication Data
US 2008/0211300 A1    Sep. 4, 2008

(30) Foreign Application Priority Data

| May 19, 2005 | (JP) | ............................. 2005-147186 |
| Jun. 7, 2005 | (JP) | ............................. 2005-166811 |
| Apr. 11, 2006 | (JP) | ............................. 2006-108967 |

(51) Int. Cl.
B62D 55/24    (2006.01)
(52) U.S. Cl. ...................................... 305/178; 305/165
(58) Field of Classification Search ................. 305/157, 305/160, 165–167, 169, 170, 178, 179, 195
See application file for complete search history.

(56) References Cited

U.S. PATENT DOCUMENTS 5,984,438 A * 11/1999 Tsunoda et al. ............. 305/169

(Continued)

FOREIGN PATENT DOCUMENTS

CA    2 407 015 A1    4/2004

(Continued)

OTHER PUBLICATIONS

European Search Report dated Jun. 30, 2009.

*Primary Examiner*—Russell D Stormer
(74) *Attorney, Agent, or Firm*—Sughrue Mion, PLLC

(57) ABSTRACT

The present invention provides a crawler in which, due to alteration of a shape of rubber projections which mesh with a sprocket, even when earth, sand and the like has been deposited at an inner peripheral surface of the crawler, damage to the concerned rubber projections will not be incurred. It is a core-less crawler track at an inner peripheral surface of which rubber projections for driving are formed with a certain pitch. In side view, the rubber projections form a substantially triangular shape provided with a drive side inclination surface Pa and a brake side inclination surface Pb. The inclination surfaces of this rubber projection are divided into the drive side inclination surface Pa and the brake side inclination surface Pb. Steps D are formed at both the inclination surfaces. Base side (bottom step) inclination angles X are set with an inclination angle XB of a brake side inclination surface Pba larger than an inclination angle XA of a drive side inclination surface Paa, and top side (top step) inclination angles Y are set with an inclination angle YA of a drive side inclination surface Pab larger than an inclination angle YB of a brake side inclination surface Pbb.

8 Claims, 7 Drawing Sheets

U.S. PATENT DOCUMENTS

| | | | |
|---|---|---|---|
| 6,000,766 A * | 12/1999 | Takeuchi et al. | 305/160 |
| 6,139,121 A * | 10/2000 | Muramatsu | 305/173 |
| 6,193,335 B1 * | 2/2001 | Edwards | 305/167 |
| 6,609,772 B2 * | 8/2003 | Musselman et al. | 305/180 |
| 7,114,788 B2 * | 10/2006 | Deland et al. | 305/157 |
| 7,156,474 B2 * | 1/2007 | Safe et al. | 305/199 |
| 2004/0135433 A1 | 7/2004 | Inaoka et al. | |

FOREIGN PATENT DOCUMENTS

| | | |
|---|---|---|
| CA | 2 533 344 A1 | 8/2006 |
| EP | 1 437 292 A1 | 7/2004 |
| JP | 06072362 A * | 3/1994 |
| JP | 9-193852 A | 7/1997 |
| JP | 2000-53038 A | 2/2000 |
| JP | 2000-72057 A | 3/2000 |
| JP | 2004-98793 A | 4/2004 |
| JP | 2004-216992 A | 8/2004 |

* cited by examiner

CORE-LESS CRAWLER TRACK AND RUBBER PROJECTIONS THEREFORE

TECHNICAL FIELD

The present invention relates to a core-less crawler track (hereafter referred to as a crawler where such will not be a problem), and is principally for resolving problems with meshing between rubber projections for driving, which are formed at the crawler (hereafter referred to as rubber projections where such will not be a problem), and a sprocket.

BACKGROUND ART

A core-less crawler track is provided for comparatively high speed running. A driving system thereof is a structure in which rubber projections are formed from an inner peripheral surface of the crawler with a certain pitch, and a sprocket meshes therewith. The sprocket is generally formed with driving portions, which mesh with the aforementioned rubber projections, and rim portions to left and right of the driving portions, which touch against the inner peripheral surface of the crawler. The driving portions are, for example, a pin type, or a gear type is common. Herein, the present invention will be described with focus on a pin-type sprocket.

FIG. 1 is a sectional view of a sprocket portion of a conventional ordinary crawler-running apparatus, and FIG. 2 is a side view thereof. At a crawler 1, rubber projections 2 with a certain pitch are protrudingly formed at the middle of an inner peripheral surface, and lugs 3 are formed at an outer peripheral surface. Steel cords 4 are embedded, oriented in a length direction of the crawler 1. Further, 5 is a sprocket, at which pins 7 are provided standing at edges of a pair of discs 6, and the sprocket 5 includes rim portions 8 which touch against the inner peripheral surface of the crawler 1 at distal ends of the discs 6. The rubber projections 2 are commonly formed in a substantial isosceles triangle shape with left-right symmetry in side view, as shown in FIG. 3. An angle Z of a base portion of an inclination surface 9 which rises up from the crawler is about 54°.

At the running apparatus of the crawler structured with the crawler 1 and the sprocket 5, in a usual state as shown in the drawings, the rim portions 8 of the sprocket 5 touch against the inner peripheral surface of the crawler 1, and the pins 7 unforcedly mesh with and transmit driving force to a predetermined portion of the inclination surfaces 9 of the rubber projections 2.

However, in the crawler-running apparatus constituted with the structure described above, under high traction, the pins 7 of the sprocket 5 apply large force to the rubber projections 2. Consequently, the rubber projections 2 are greatly deformed, a phenomenon known as jumping (jumping) in which the pins 7 slip arises, and vibrations occur. If this is repeated, there may be a result that the rubber projections 2 are damaged.

Further, as shown in FIG. 4, depositions S of earth, sand and the like at the inner peripheral surface of the crawler 1 may be unavoidable and in such a state, as shown in FIG. 5, a relationship between the rubber projections 2 of the crawler 1 and the pins 7 of the sprocket 5 is shifted from predetermined positions, contacts are repeated, and the rubber projections 2 may be damaged. Ultimately, the aforementioned jumping between the pins 7 and the rubber projections 2 occurs and, further, there may be a result that the rubber projections 2 are damaged.

DISCLOSURE OF INVENTION

Problem to be Solved by the Invention

The present invention is for solving a defect of a conventional running apparatus as described above, and provides a crawler at which damage to rubber projections that mesh with a sprocket will not be incurred even if, for example, earth, sand or the like is deposited at an inner peripheral surface of the crawler.

Means for Solving the Problem

The essence of the present invention relates to a core-less crawler track, at an inner peripheral surface of which rubber projections for driving are formed with a certain pitch, the core-less crawler track having the characteristics that the rubber projection, in side view, forms a substantially triangular shape provided with a drive side inclination surface Pa and a brake side inclination surface Pb, steps D are formed at the two inclination surfaces Pa and Pb, and inclination angles X of base side (bottom step) inclination surfaces Paa and Pba are larger than inclination angles Y of top side (top step) inclination surfaces Pab and Pbb. Further, the present invention provides a core-less crawler track in which the inclination angles X of the bottom step inclination surfaces Paa and Pba are 60° to 90° and the inclination angles Y of the top step inclination surfaces Pab and Pbb are 40° to 70°. Herein, a height of the steps D being formed at a position 6/10 to 7/10 from a base portion is excellent.

Considering more characteristically, it is a core-less crawler track in which the inclination surfaces P of the substantially triangular rubber projection are divided into the drive side inclination surface Pa and the brake side inclination surface Pb, the steps D are formed at the two inclination surfaces Pa and Pb, the base side (bottom step) inclination angles X are set with an inclination angle XB of the brake side inclination surface Pba larger than an inclination angle XA of the drive side inclination surface Paa, and the top side (top step) inclination angles Y are set with an inclination angle YA of the drive side inclination surface Pab larger than an inclination angle YB of the brake side inclination surface Pbb. Further, the inclination angle XA of the bottom step drive side surface Paa is 60° to 68° and the inclination angle YA of the top step drive side inclination surface Pab is 44° to 53°. Further, the inclination angle XB of the bottom step brake side inclination surface Pba is 62° to 70° and the inclination angle YB of the top step brake side inclination surface Pbb is 40° to 48°. Herein, a height of the steps D being formed at a position 6/10 to 7/10 from a base portion is excellent.

Considering further characterization of the present invention, as will be described later, the rubber projection, in side view, forms a substantially triangular shape provided with the drive side inclination surface Pa and the brake side inclination surface Pb, and a top portion of the rubber projection is offset to the drive side inclination surface Pa side. Hence, a core-less crawler track in which the brake side inclination surface Pb is formed as a gentler inclination surface than the drive side inclination surface Pa can be proposed.

EFFECTS OF THE INVENTION

Because the present invention is given the structure described above, the rubber projections are reinforced against large warping, and the jumping phenomenon at the sprocket can be reduced. That is, the rubber projection is reinforced by the steps being formed at the inclination surfaces of the rubber projection, the inclination surfaces being formed as two steps, and the respective inclination angles being specified. Consequently, even in a case of being placed under high traction or in a case in which earth and sand, stones or the like are deposited at the inner peripheral surface of the crawler, the rubber projections against which the sprocket contacts are reinforced, and consequently this has an effect in that damage will not easily arise.

Furthermore, by employing the present structure, when the rubber projections and the sprocket mesh, gaps between the two are eliminated. That is, when the crawler is wound round the sprocket, a pin is gripped between bottom step side inclination surfaces of neighboring rubber projections (a drive inclination surface and a brake side inclination surface), which is effective for suppressing the phenomenon of jumping.

BRIEF DESCRIPTION OF THE DRAWINGS

FIG. 1 is a sectional view of a sprocket portion of a common crawler-running apparatus.

FIG. 2 is a side view of FIG. 1.

FIG. 3 is an enlarged side view of a rubber projection.

FIG. 4 is a sectional view, of the same form as FIG. 1, when deposits are left at an inner peripheral surface of a crawler.

FIG. 5 is a side view of FIG. 4.

FIG. 6 is a sectional view of a sprocket portion of a crawler-running apparatus using a crawler of the present invention.

FIG. 7 is a side view of FIG. 6.

FIG. 8 is an enlarged side view of a rubber projection.

FIG. 9 is a sectional view of the crawler-running apparatus when deposits are left at an inner peripheral surface of a crawler.

FIG. 10 is a partial side view of FIG. 9.

FIG. 11 is a sectional view when deposits are left at a middle inner peripheral surface of the crawler.

FIG. 12 is a partial side view of FIG. 11.

FIG. 13 is a sectional view of the crawler-running apparatus when improved rim portions are used.

FIG. 14 is an enlarged side view, of the same form as FIG. 8, of a rubber projection.

FIG. 15 is a diagram showing a relationship between a sprocket and pins when a crawler equipped with rubber projections as illustrated in FIG. 14 is wound round the sprocket.

FIG. 16 is a diagram showing a relationship between a sprocket and pins when a crawler equipped with the rubber projection shown in FIG. 3 is wound round the sprocket.

FIG. 17A is an enlarged side view of a rubber projection, showing a variant example of the crawler.

FIG. 17B is the rubber projection shown in FIG. 3.

FIG. 18 is an enlarged side view of a rubber projection, showing a further variant example of the crawler.

BEST MODE FOR CARRYING OUT THE INVENTION

Figure 1:
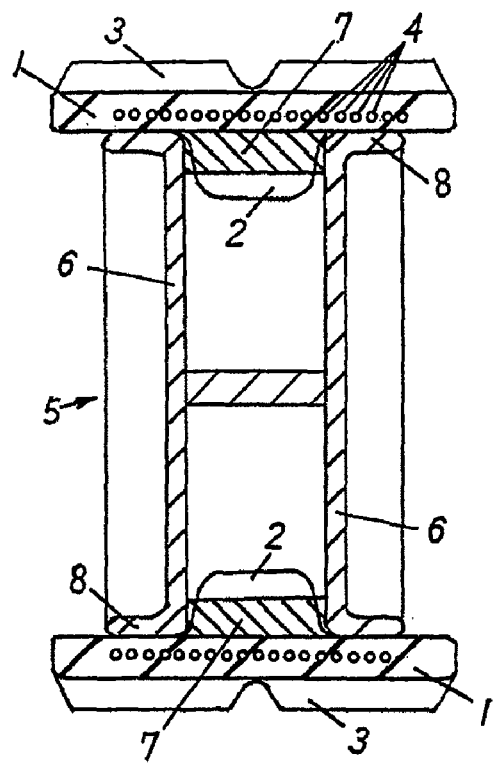
FIG. 1.
Figure 2:
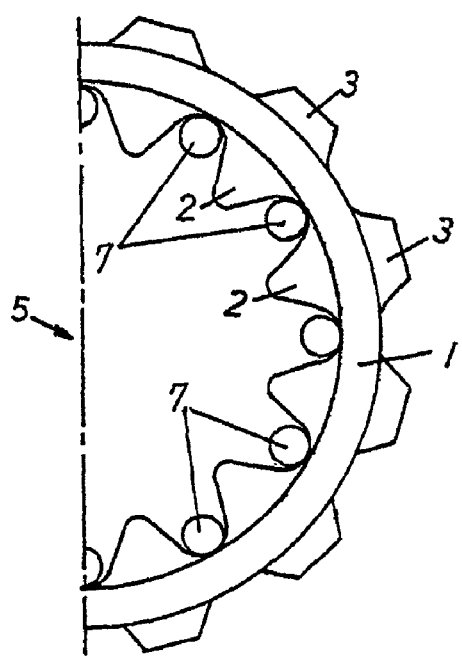
FIG. 2.

Firstly, when a relationship between a pin of a sprocket and a substantially triangular-form rubber projection is examined, a side closer to a top portion of an inclination surface is a portion of initial contact with the pin, and is a portion of transmission of driving force from the pin in a case in which deposits have been left on the crawler surface. The side closer to the top portion of the rubber projection undergoes a particularly large deformation, such that jumping at the sprocket occurs, and repeated warping is greatly applied to this portion. Consequently, the portion closer to the top portion of the rubber projection will be damaged.

In the present invention, a reason for making an inclination surface of the rubber projection two steps is in order for preventing damage to the rubber projection and jumping due to meshing failures between the pins and the rubber projections when the crawler is wound round the sprocket. That is, because the steps are formed at the inclination surfaces, in side view, the top side (top step) inclination surfaces of the rubber projection are gentle inclination surface (inclination angles Y), and the base side inclination surfaces are steep inclination surfaces (inclination angles X). Consequently, a width (horizontal direction thickness) of the rubber projection that is enclosed by the top step (top side) left and right inclination surfaces is larger (thicker) than a conventional rubber projection, and strength of the rubber projection is increased correspondingly. Herein, the steps formed at the left and right inclination surfaces may be set to substantially the same height from the inner peripheral surface of the crawler, and may be formed at positions from 6/10 to 7/10 from a base portion.

Considering the matter of inclination angles, the inclination angle X of the base side (bottom step) is set larger than the inclination angle Y of the top side (top step) (X>Y), and an improvement is applied to the rubber projection, which is that the inclination angle X of the bottom step is set to 60° to 90°, and the inclination angle Y of the top step is set to 40° to 70°.

The invention is devised from further examination of behavior of the rubber projection, and presents consideration and a response of dividing the inclination surfaces of the rubber projection into a drive side inclination surface, which contacts with the pin and principally provides driving force for advancing a vehicle body, and a brake side inclination surface, at which the pin rests during braking (or reversal) and contacts therewith. The shape of the rubber projection is determined by a locus of meshing with the pin, and at usual times the brake side inclination surface meshes with the pin only during reversing.

The invention is provided from observations of the meshing locus between the concerned pin and the rubber projection and, in particular, because at usual times the brake side inclination surface only meshes with the pin during reversing, is a structure in which a width of this inclination surface side is increased and strength of the rubber projection is improved. With this invention, the width of a braking surface is broadened, and thus pin-holding is achieved at a time of winding round. For such reasons, the drive side inclination surface and brake side inclination surface of the rubber projection have a non-symmetrical form, and jumping, due to meshing failures between the rubber projections and the pins when the crawler is wound round the sprocket, is prevented from occurring.

Considering the matter of inclination angles, improvements are applied to the rubber projection, which are that an inclination angle XA of the bottom step of the drive side inclination surface is set to 60° to 68°, an inclination angle YA of the top step of the drive side inclination surface is set to 45° to 53°, an inclination angle XB of the bottom step of the brake side inclination surface is set to 62° to 70°, and an inclination angle YB of the top step of the brake side inclination surface is set to 40° to 48°. Herein, the steps formed at the left and right inclination surfaces may be set to substantially the same height from the inner peripheral surface of the crawler, and may be formed at positions from 6/10 to 7/10 from a base portion.

A further feature of the invention is as described below. That is, with the inclination surfaces of a rubber projection of a conventional shape, gaps are present between the rubber projections and the pins even when the crawler has been wound round the sprocket. Consequently, occurrences of detachment of meshing between the two and jumping are incurred. However, the shape of the rubber projection according to the present invention has a broadened thickness (width) of the rubber at the bottom step in side view. Consequently, during winding round the sprocket, the pin is sandwiched by the bottom steps of opposing inclination surfaces (a drive side inclination surface and a brake side inclination surface) and disengagement is prevented, which eliminates the phenomenon of jumping.

The shape of the rubber projection is particularly limited in order to express these effects. Each inclination surface is formed of the upper and lower two steps, and the inclination angles of the top steps and inclination angles of the bottom steps are specified in optimal ranges in consideration of relationships between pins and the drive side face and the brake side face.

EXAMPLE

Figure 6:
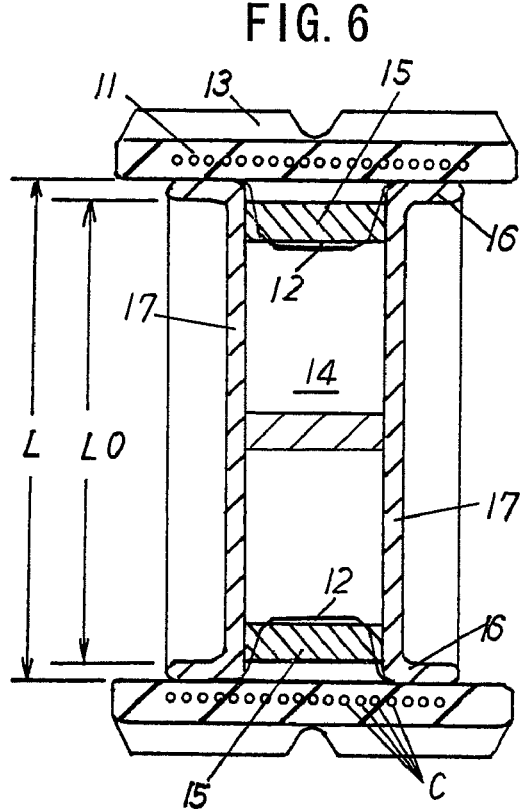
FIG. 6.
Figure 7:
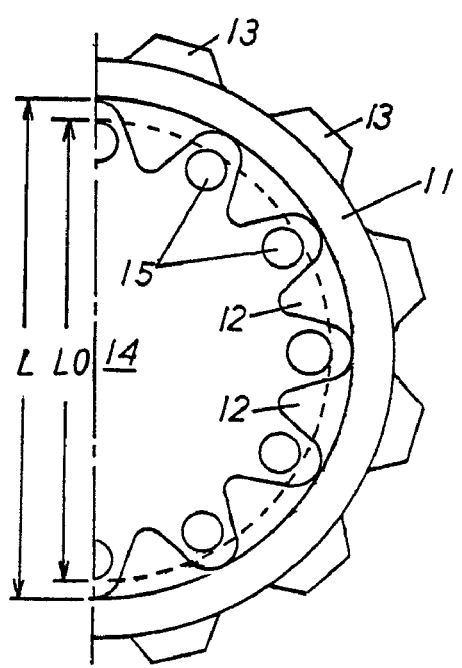
FIG. 7.

Below, the present invention will be described in more detail with the drawings. FIG. 6 is a diagram (a sectional view of a sprocket portion) of a core-less crawler-running apparatus of the present invention, and FIG. 7 is a side view thereof. Reference numeral 11 is a crawler, and rubber projections 12 with a certain pitch are protrudingly formed at the middle of an inner peripheral surface thereof. Here, 13 are lugs formed at an outer peripheral surface. Furthermore, steel cords C are embedded, oriented in the length direction of the crawler.

14 is a sprocket, and is provided with pin-type driving portions (pins) 15, which mesh with the above-mentioned rubber projections 12 and transmit driving force, and discs 17 at distal ends at left and right side portions thereof, which include rim portions 16 in parallel with the inner peripheral surface of the crawler 11 that touch against the surface thereof.

In a running apparatus structured with these two, in a usual state as shown in the drawings, the rim portions 16 touch against the inner peripheral surface of the crawler 11, and the pins 15 unforcedly mesh with the rubber projections 12 and transmit driving force.

Herein, the pins 15 of the sprocket 14 are provided in correspondence with the rim portions 16 at peripheral edges of the discs 17. However, the illustrated example is an example designed with a diameter L0 of a circumscribed circle of the pins 15 being smaller than a diameter L of the rim portions 16. Consequently, structures which touch against sides close to top portions of the rubber projections 12 are formed in advance. Thus, even in a case in which earth, sand and the like is deposited S at the inner peripheral surface of the crawler between the rubber projections 12 and 12, the pins 15 none the less implement meshing of the rubber projections 12 therewith, a positional relationship between the sprocket 14 and the crawler 11 is not changed, and consequently there is a feature in that phenomena such as wheel-offs and the like rarely occur.

Figure 8:
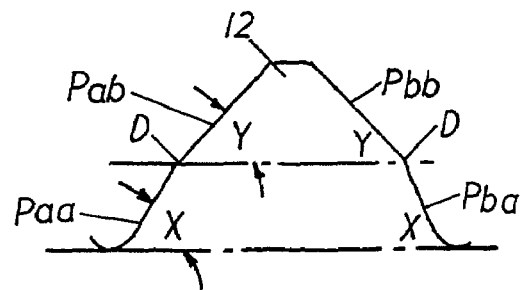
FIG. 8.

Now, FIG. 8 is a side view in which only the rubber projection 12 is drawn out, at which steps D are formed at the inclination surfaces and these inclination surfaces are formed as two steps. Inclination angles of base side inclination surfaces Paa and Pba are X, and inclination angles of top side inclination surfaces Pab and Pbb, of portions which contact with the driving portions, are Y Furthermore, relationships X>Y apply, and a shape in which the base sides are more outstanding is formed. This example is an example in which X is 60° and Y is 45°.

Thus, when the pin 15 of the sprocket 14 touches against the top side inclination surface Pab of the rubber projection 12, because the inclination angle X of the base side is set larger, a horizontal direction width W of the rubber projection at the top side is a substantially increased width compared to the same at a conventional rubber projection. Consequently, strength as far as the top portion of the rubber projection 12 is assured.

Figure 9:
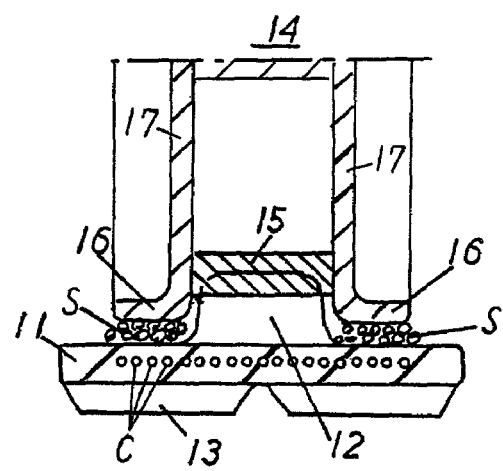
FIG. 9.
Figure 10:
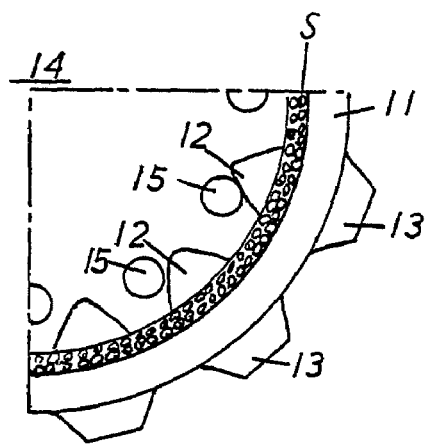
FIG. 10.

FIG. 9 is a sectional half view of a case in which there are deposits S of earth and sand between the inner peripheral surface of the crawler 11 and the rim portions 16 of the sprocket 14, and FIG. 10 is a partial side view thereof. Nevertheless, the pin 15 of the sprocket 14 contacts with the top side inclination surface Pab of the rubber projection 12 (that is, an inclination surface at which the width of the rubber projection has been increased), and there are substantially the same results as with usual meshing.

Figure 11:
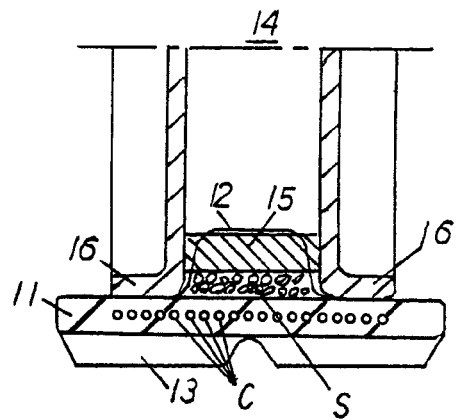
FIG. 11.
Figure 12:
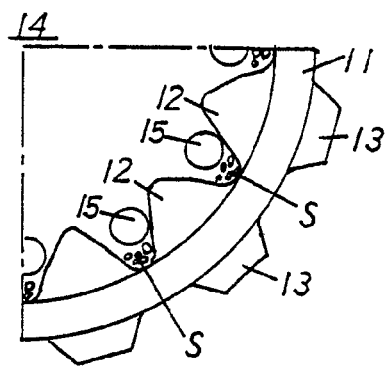
FIG. 12.

FIG. 11 is a sectional half view of a case in which there are deposits S of earth and sand between the inner peripheral surface of the crawler 11 and the pins 15 of the sprocket 14, and FIG. 12 is a partial side view thereof. Nevertheless, in a case in which the circumscribed circle diameter L0 of the pins 15 is set to 8 mm smaller than the diameter L of the rim portions 16, rather than pressing the deposited S earth, sand and the like against the inner peripheral surface of the crawler 11, similarly to the above-mentioned example, the pin 15 contacts with the top side of the rubber projection 12, and it meshes without causing damage to the inner peripheral surface of the crawler 11.

Figure 13:
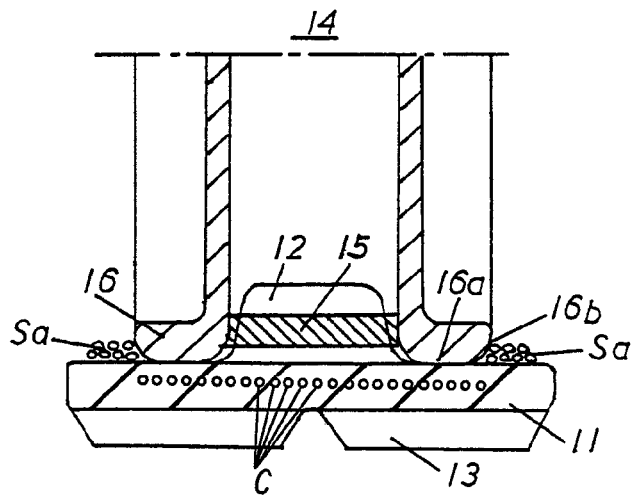
FIG. 13.

Here, at the rim portion 16 of the sprocket 14, as shown in FIG. 13, providing an inclined surface 16b at the left-right width direction relative to a central portion 16a, which touches against the inner peripheral surface of the crawler 11, is desirable. Consequently, earth, sand and the like Sa that tends to be deposited at the inner peripheral surface of the crawler 11 can be expelled in the left-right direction at the inclined surface 16b. Thus, an effect is provided in that damage to the rubber projections 12 is reduced correspondingly and no damage is done to the inner peripheral surface of the crawler 11. Here, a width of the central portion 16a of the rim portion 16 may be set to around 1/3 to 1/2 of a total width of the rim portion 16. The inclined surface 16b can also be provided at the width direction inner side of the crawler 11 as shown in the drawings and, although the face thereof is a curved surface, obviously, it could be a linear inclination surface.

Figure 14:
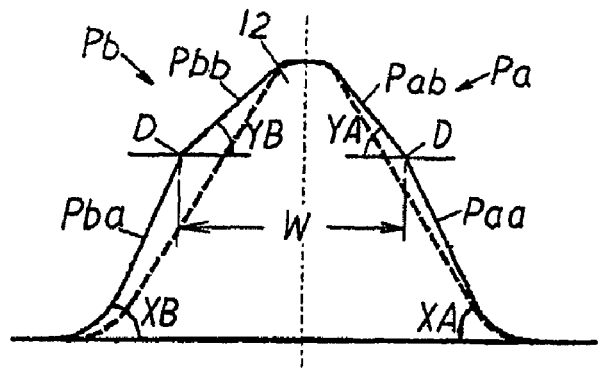
FIG. 14.

FIG. 14 is a partial enlarged sectional view, similar to FIG. 8, of the rubber projection 12. The rubber projection 2 has the steps D and, in side view, the drive side inclination surface Pa is formed as the upper and lower two steps Paa and Pab and the brake side inclination surface Pb is formed as the upper and lower two steps Pba and Pbb. In this example, the inclination angle XA of the bottom step inclination surface Paa of the drive side inclination surface Pa is 64°, and the inclination angle YA of the top step Pab inclination surface Pab of the drive side inclination surface Pa is 50.5°. Meanwhile, the inclination angle XB of the bottom step inclination surface Pba of the brake side inclination surface Pb is 66°, and the inclination angle YB of the top step inclination surface Pbb is 43.6°. A rising portion from the crawler 1 rose with a curved surface of radius 15. Further, in this example, a height of the rubber projection 12 was 60 mm, a height of the step D was 40 mm, a width between base portion front and rear was 84 mm, and a width W between the steps D-D was 47.5 mm. A relationship between neighboring rubber projections 12 and 12 was centers of top portions being at 110 mm.

Figure 3:
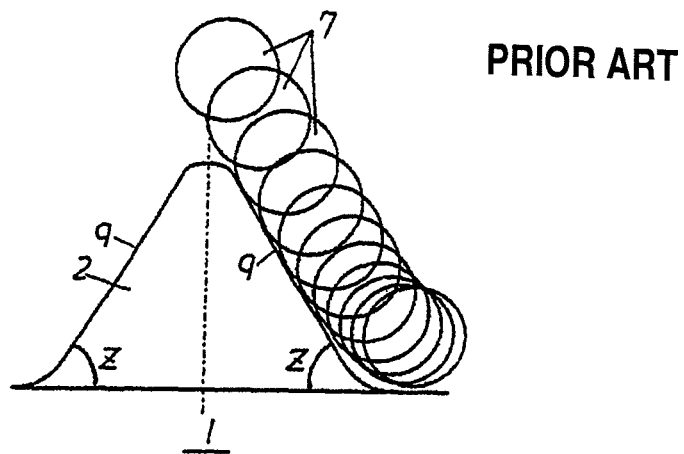
FIG. 3.
Figure 4:
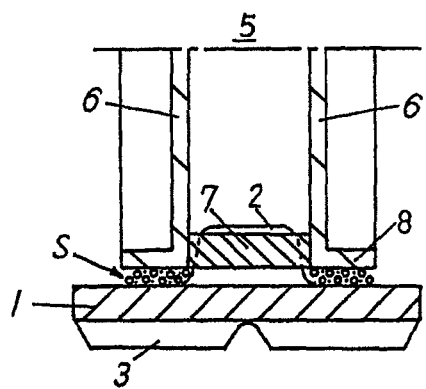
FIG. 4.
Figure 5:
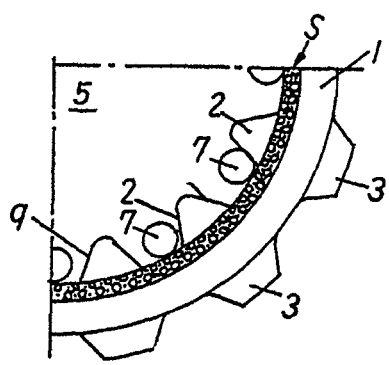
FIG. 5.

When the above-described rubber projection 12 is compared with the conventional item of FIG. 3, this rubber projection 12 is specified such that the steps D are formed in the inclination surfaces Pa and Pb and the respective inclination angles are made different, in addition to which the inclination angle X of the drive side inclination surface and the inclination angle Y of the brake side inclination surface are respectively different. Consequently, the rubber projection 12 of this invention, if viewed from the top portion, is offset to the drive side inclination surface Pa side, and exhibits a non-symmetrical form. In addition, the rising angles of the bottom steps (XA and XB) both form steeper inclination angles than those of the conventional rubber projection (shown by broken lines in the drawing) and, conversely, the inclination angles of the top steps (YA and YB) both form gentler inclination angles. Consequently, the rubber projection 12 as a whole is a structure in which the rubber width is fatter. That is, from the relationships of the angles, the drive side inclination surface Pa is relatively closer to a conventional inclination surface and the shape of the brake side inclination surface Pb is greatly different from the conventional shape. Here, the shape of a conventional rubber projection is an isosceles triangle shape with left and right being substantially symmetrical, and angles of the base portion are 54°.

Figure 15:
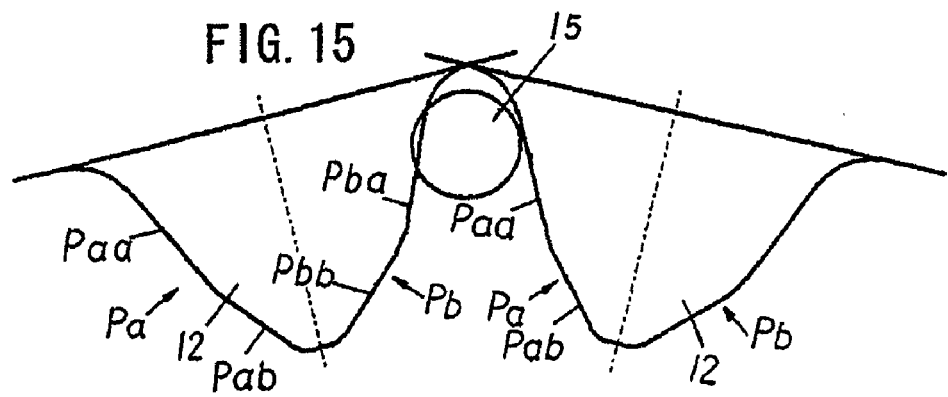
FIG. 15.

FIG. 15 shows an example of a relationship with a pin 7 of the sprocket when the crawler (the crawler including the rubber projection 12 of FIG. 14) is wound round the sprocket. As shown in the drawing, the pin (diameter 27 mm) 15 is gripped between the bottom step inclination surfaces Paa and Pba at the drive side and brake side of neighboring rubber projections 12 and 12. This provides a function of blocking a disengaging movement, which reduces the phenomenon of jumping due to disengagement of the pins 15.

Figure 16:
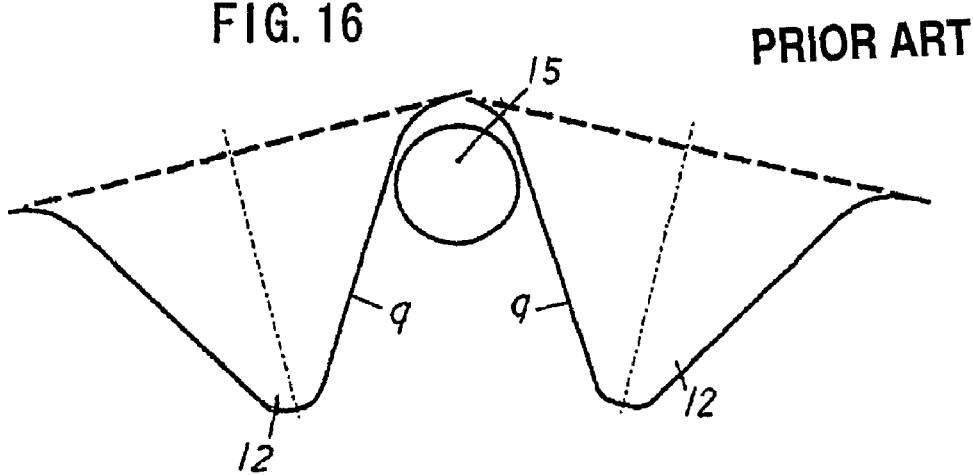
FIG. 16.

Meanwhile, FIG. 16 shows a relationship between the conventional rubber projection 12 shown in FIG. 3 and the pin 15. At the pin 15 between the inclination surfaces 9 and 9 with left-right symmetry, a clearance arises. Consequently, the pin 15 is not gripped and there is hardly any effect of blocking jumping.

Of course, because the rubber thickness (width) in the direction in which the pin 15 pushes the rubber projection 2 is thicker than the same in convention, phenomena of rubber chipping and the like of the rubber projection 2 are comparatively small.

With the invention as aforementioned, at usual times, the brake side inclination surface only meshes with the pin at times of reversing. Therefore, a structure is formed in which the width of this inclination surface side is enlarged and strength of the rubber projection is improved. That is, with the invention, the width of the braking face is broadened, which prevents occurrences of jumping due to meshing failures between the rubber projections and the pins when the crawler is wound round the sprocket.

During running of the crawler, depositions of earth, sand and the like at the inner peripheral surface of the crawler are when the crawler progresses from a ground contact face side toward the sprocket. Thus, abrasion of the inclination surfaces of the rubber projections against the sprocket is limited to the surfaces at a progress direction side at these times. Therefore, it is possible to investigate a solution which differs from disclosed structures and furthermore differs from the conventional structure. It has been discovered that the objective is achieved if, rather than the rubber projection forming a substantially triangular shape in side view, the middle of the top portion of the rubber projection is offset to the opposite side from the direction of progress when advancing from the ground contact face side toward the sprocket (during usual forward running). That is, it has been learned that it is possible to satisfactorily achieve the objective even if the progress direction inclination surface is formed as a gentle inclination surface in a side view of the rubber projection.

That is, a core-less crawler track at which rubber projections for driving are formed with a certain pitch at the inner peripheral surface, the core-less crawler track having the characteristics that the rubber projection forms a substantially triangular shape provided with a drive side inclination surface Pa and a brake side inclination surface Pb in side view and that a top portion of the rubber projection is offset to the drive side inclination surface Pa side, is preferable. Considering further, it is a core-less crawler track provided with a rubber projection of which the brake side inclination surface Pb is formed as a gentler inclination surface than the drive side inclination surface Pa.

Figure 17A:
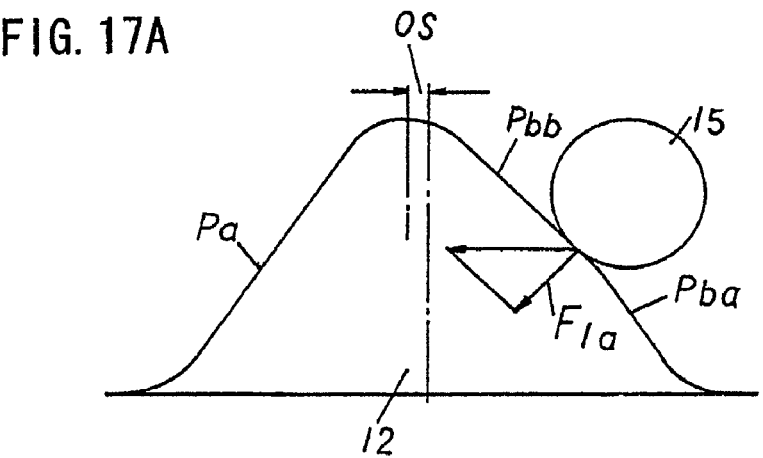
FIG. 17A.

FIG. 17 is a side view showing a relationship between the crawler 1 and the pin 15, and FIG. 17A is a side view of this rubber projection 12. As is understood from the drawings, the inclination surface Pb of the rubber projection 12 is the inclination surface when crawler 1 advances from the ground contact face side toward the pin 15, and the shape of the inclination surface Pb is improved by the top portion of the rubber projection 12 being offset OS to the inclination surface Pa side. The inclination surface Pb side is formed as two steps from the top portion, the inclination surface Pba and the inclination surface Pbb, and the Pb side is formed as a gentle inclination surface.

Figure 17B:
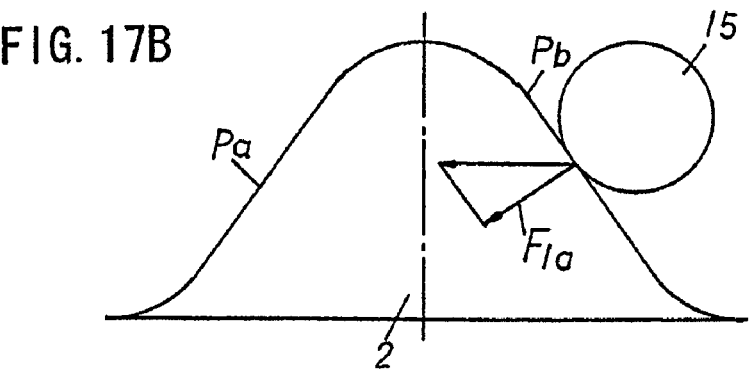
FIG. 17B.

Considering a relationship with the pin 15, a normal direction force F1a with which the pin 15 contacts against this gentle inclination surface Pb is smaller by an amount by which the inclination surface is gentler in comparison with that of a conventional rubber projection shown in FIG. 17B. Consequently, effects on the rubber projection 12 are smaller, and deterioration and chipping are less likely to arise.

Figure 18:
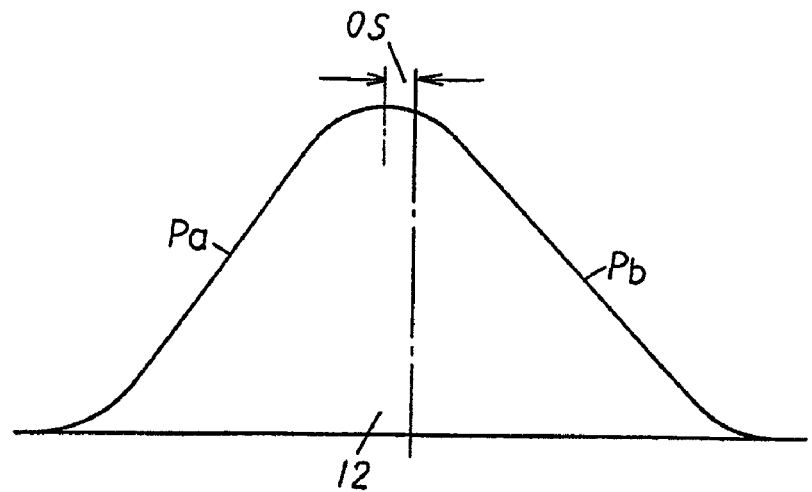
FIG. 18.

Here, in this case, forming a two-step inclination surface is not necessarily required, and the gradient of the inclination surface Pb may be made gentler by offsetting OS the top surface to the inclination surface Pa side. FIG. 18 shows an example thereof.

Now, with the rubber projections 12 depicted in FIG. 17A and FIG. 18, in a case in which earth, sand and the like is deposited S at the inner peripheral surface of the crawler and the rubber projections 12 of the crawler are meshed with the pins 15 in this state, the pin 15 will contact with the inclination surface Pb at the side of advance of the rubber projection 12 toward this pin 15. In particular, chipping of the rubber projection 12 arises due to scraping by the pin 15 against the concerned inclination surface Pb of the rubber projection 12.

In this example, even in a case in which scraping by the pin 15 arises, effects on the rubber projection 12 are reduced.

INDUSTRIAL APPLICABILITY

The present invention is an invention in which a state of contact between a rubber projection and a sprocket is altered by changing the shape of a rubber projection of a crawler. Consequently, this reduces occurrences of rubber cracking and rubber chipping at the rubber projection. The concerned rubber projection can be applied to all rubber projections for driving force transmission of a core-less crawler track, and an application value thereof is extremely high. Herein, the sprocket is a pin type but may of course be a gear type or whatever.

EXPLANATION OF REFERENCE NUMERALS AND SIGNS

11 . . . . Crawler
12 . . . . Rubber projection
13 . . . . Lug
14 . . . . Sprocket
15 . . . . Pin
16 . . . . Rim portion
16a . . . . Central portion of rim portion
16b . . . . Inclined surface of rim portion
17 . . . . Disc
C . . . . Steel cords
D . . . . Step
L . . . . Diameter of rim portion
L0 . . . . Diameter of circumscribed circle of pins
Pa . . . . Drive side inclination surface
Pb . . . . Brake side inclination surface
Paa, Pba . . . . Inclination surfaces at base sides of rubber projections
Pab, Pbb . . . . Inclination surfaces at top sides of rubber projections
S . . . . Deposits
W . . . . Horizontal direction width of rubber projection at top side
X . . . . Inclination angle of inclination surface at base side
   XA . . . . Inclination angle at base side (bottom step) of drive side inclination surface
   XB . . . . Inclination angle at top side (top step) of drive side inclination surface
Y . . . . Inclination angle of inclination surface at top side
   YZ . . . . Inclination angle at base side (bottom step) of brake side inclination surface
   YB . . . . Inclination angle at top side (top step) of brake side inclination surface

The invention claimed is:

1. A core-less crawler track, comprising:
rubber projections for driving formed at an inner peripheral surface of a crawler, wherein:
   each rubber projection, in side view, forms a substantially triangular shape provided with a drive side inclination surface Pa and a brake side inclination surface Pb,
   the drive side inclination surface Pa and the brake side inclination surface Pb are each provided with a bottom step and a top step,
   inclination angles X of the bottom step Paa, Pba of each of the drive side inclination surface Pa and the brake side inclination surface Pb are larger than inclination angles Y of the top step Pab, Pbb of each of the drive side inclination surface Pa and the brake side inclination surface Pb,
   the bottom step inclination angles X are set with an inclination angle XB of the brake side inclination surface Pb being larger than an inclination angle XA of the drive side inclination surface Pa, and
   the top step inclination angles Y are set with an inclination angle YA of the drive side inclination surface Pa being larger than an inclination angle YB of the brake side inclination surface Pb.

2. The core-less crawler track of claim 1, wherein the inclination angles X of the bottom steps Paa and Pba are 60° to 90°.

3. The core-less crawler track of claim 1, wherein the inclination angles Y of the top steps Pab and Pbb are 40° to 70°.

4. The core-less crawler track of claim 2, wherein the inclination angle XA of the bottom step Paa of the drive side inclination surface Pa is 60° to 68°.

5. The core-less crawler track of claim 3, wherein the inclination angle YA of the top step Pab of the drive side inclination surface Pa is 45° to 53°.

6. The core-less crawler track of claim 2, wherein the inclination angle XB of the bottom step Pba of the brake side inclination surface Pb is 62° to 70°.

7. The core-less crawler track of claim 3, wherein the inclination angle YB of the top step Pbb of the brake side inclination surface Pb is 40° to 48°.

8. The core-less crawler track of claim 1, wherein a height of each of the steps is formed at a position 6/10 to 7/10 from a base portion.

\* \* \* \* \*